United States Patent
Lipman (10) Patent No.: US 6,564,893 B2
(45) Date of Patent: May 20, 2003

(54) PRE-WIRED BATTERY BOX FOR RAPID INSTALLATION AND CONNECTION OF BATTERIES

(76) Inventor: Murray Lipman, 66 Agress Rd., Perrineville, NJ (US) 08535

( * ) Notice: Subject to any disclaimer, the term of this patent is extended or adjusted under 35 U.S.C. 154(b) by 12 days.

(21) Appl. No.: 09/812,182

(22) Filed: Jun. 25, 2001

(65) Prior Publication Data

US 2003/0047364 A1 Mar. 13, 2003

Related U.S. Application Data

(60) Provisional application No. 60/254,979, filed on Dec. 12, 2000.

(51) Int. Cl.$^7$ .............................. B60R 16/04; H01M 2/02
(52) U.S. Cl. ....................... 180/68.5; 429/176; 429/179
(58) Field of Search .......................... 180/68.5; 429/187, 429/121, 100, 48, 163, 176, 179; 296/37.1, 37.5; 229/117.09, 117.23, 117.26, 125.08

(56) References Cited

U.S. PATENT DOCUMENTS

| 897,472 A | * | 9/1908 | Marx .......................... 429/176 |
|---|---|---|---|
| 2,707,721 A | * | 5/1955 | Anderson et al. ........... 429/100 |
| 3,379,400 A | * | 4/1968 | Bauschard ................... 248/507 |
| 4,723,618 A | | 2/1988 | Coonradt |
| 4,754,827 A | * | 7/1988 | Hirabayashi ................ 180/68.5 |
| 4,756,978 A | * | 7/1988 | Nitcher et al. .................. 429/1 |
| 4,966,346 A | | 10/1990 | Kärnä et al. |
| 5,232,796 A | * | 8/1993 | Baumgartner ............... 429/187 |
| 5,236,792 A | | 8/1993 | Larkin et al. |
| 5,293,951 A | | 3/1994 | Scott |
| 5,692,466 A | | 12/1997 | Hausmann et al. |
| 5,987,936 A | | 11/1999 | Hartman, Jr. |

* cited by examiner

Primary Examiner—Paul N. Dickson
Assistant Examiner—Laura B. Rosenberg
(74) Attorney, Agent, or Firm—Duane Morris LLP (57) ABSTRACT

A box mounted on a vehicle or stationary frame for holding an automotive type battery. Said battery is kept in contact with internal terminals which are located in the box. The box is internally tapered to match an external taper on the battery, and has guide rails to facilitate insertion of the battery. A means to assist in the removal of the battery is provided, as is a spring loaded battery carrying strap. A plurality of the boxes may be electrically connected in parallel or series.

17 Claims, 16 Drawing Sheets

PRE-WIRED BATTERY BOX FOR RAPID INSTALLATION AND CONNECTION OF BATTERIES

This application claims the benefit of U.S. Provisional Application No. 60/254,979 filed Dec. 12, 2000.

FIELD OF THE INVENTION

The present invention relates to a permanently mounted box or boxes constructed of a non-conductive, non-corrosive material, such as plastic or fiberglass, having tapered internal surfaces, with built-in terminal connectors, into which a battery or batteries used for engines are placed. Said battery or batteries having tapered exterior surfaces and terminals are inserted into the box or boxes, and affixed to the interior of the box, assuring a positive electrical contact. Said boxes may be electrically connected in series or parallel by numerous means.

BACKGROUND OF THE INVENTION

While numerous prior inventions have taught enclosures for batteries, such as Larkin et al., U.S. Pat. No. 5,236,792 and Hausman, U.S. Pat. No. 5,692,466, none of these contemplate a combination which teach a pre-wired capsule, providing means for easy installation and removal of a battery, providing rapid electrical connection with an external electrical system. Larkin et al. is directed towards a means of a carrying a battery, whereas Hausman et al shows a mounting and support arrangement.

OBJECTS OF THE INVENTION

It is an object of the present invention, therefore, to provide a permanently mounted battery box or boxes such that engine batteries can be rapidly and easily installed and removed. It is a further object of the invention to accomplish this installation and removal with a minimal amount of mechanical ability and the reduction of possible error. Another object is to eliminate the need for tools.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE DRAWINGS

Figure 1:
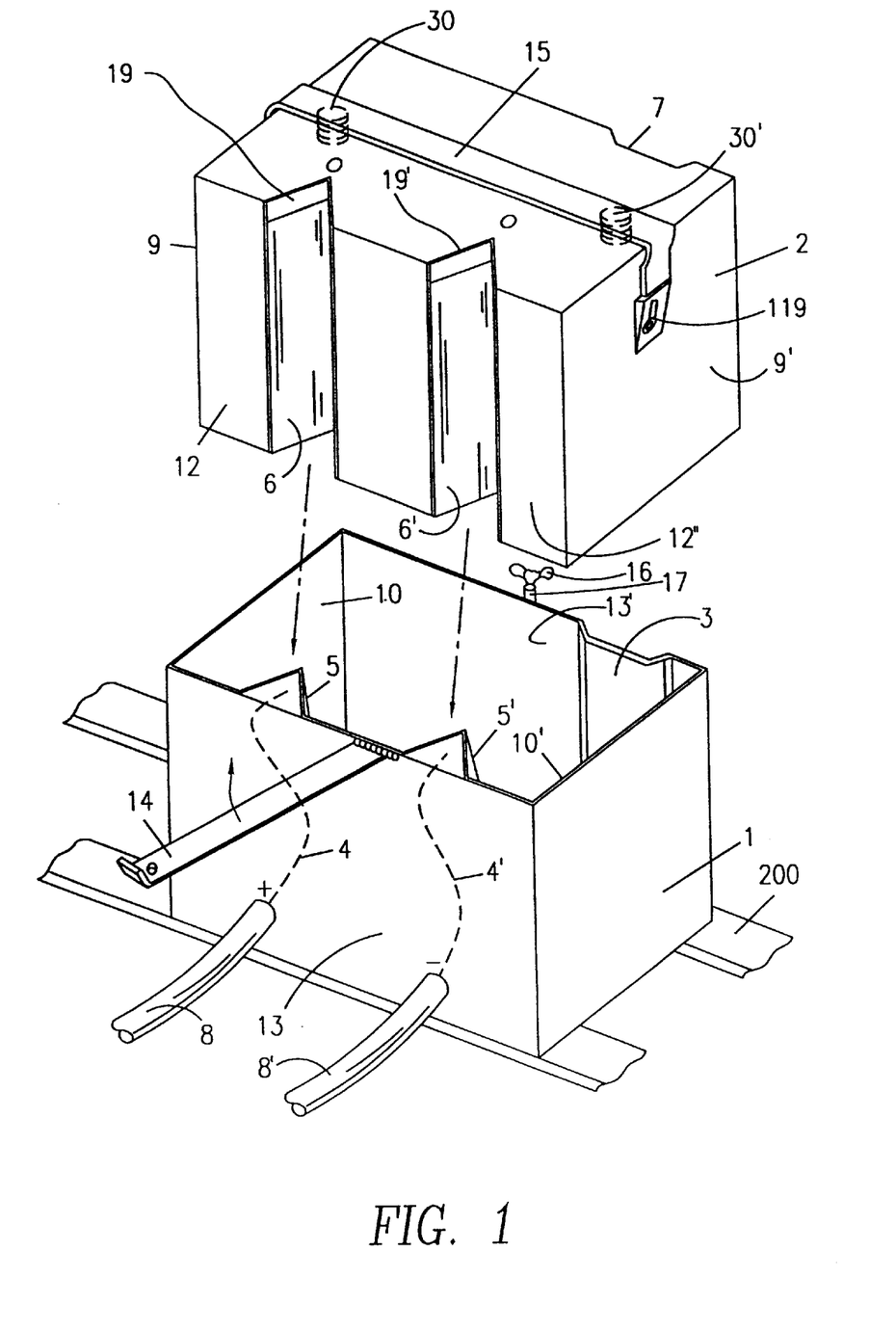
FIG. 1 is a perspective view of the invention showing a battery being inserted into a battery box from the top, with the box mounted to a frame.

Referring to FIG. 1, there is shown a battery system according to an embodiment of the invention. The battery system comprises a single battery box, 1, which is mounted on a frame of a vehicle or engine mount, and a battery, 2, removably inserted in the box.

The battery box, 1, is constructed with four inwardly tapered interior walls, 10 and 10', 13 and 13', respectively. A pair of internal vertical convex electrical terminals, 5 and 5', typically "V" shaped, extend from the interior bottom of the box, 1, up to a short distance from the top of the front interior wall, 13. The terminals, 5 and 5', are electrically connected to a pair of external cables, 8 and 8', respectively. The external cables, 8 and 8', are connected internally to the terminals, 4 and 4', respectively. A convex vertical guide groove, 3, is located off-center on the rear wall, 13'of the box, 1. The guide groove, 3, is placed off-center to match a vertical concave guide groove, 7, on the battery, 2. This facilitates proper placement of the battery, 2, in the box, 1. As seen, the battery, 2, has a pair of convex vertical electrically connected terminals, 6 and 6', on its front face, 12, such that they align with the terminals, 5 and 5'on the box, 1, when the battery, 2, is vertically inserted into the box, 1. This further aids in positively securing the battery, 2, in the box, 1. The tops of the battery terminals, 19 and 19', respectively, are non-conductive to insure that the battery, 2, is inserted with correct polarity. The exterior walls of the battery, 2, are tapered to conform to the interior walls of the box, 1. The box, 1, has a latch, 14, which swings across its top for securing the battery, 2, and is tied down by a non-corrosive rod, 17, and wing nut, 16. In addition, the battery, 2 has a slotted, 119, spring loaded strap handle, 15, for lifting the battery, 2. Built-in springs, 30 and 30', are used which lift the strap handle, 15, for easy grasping when the latch, 14, is removed and exert pressure to hold the battery, 2, when the latch, 14, is in the locked position.

Figure 1A:
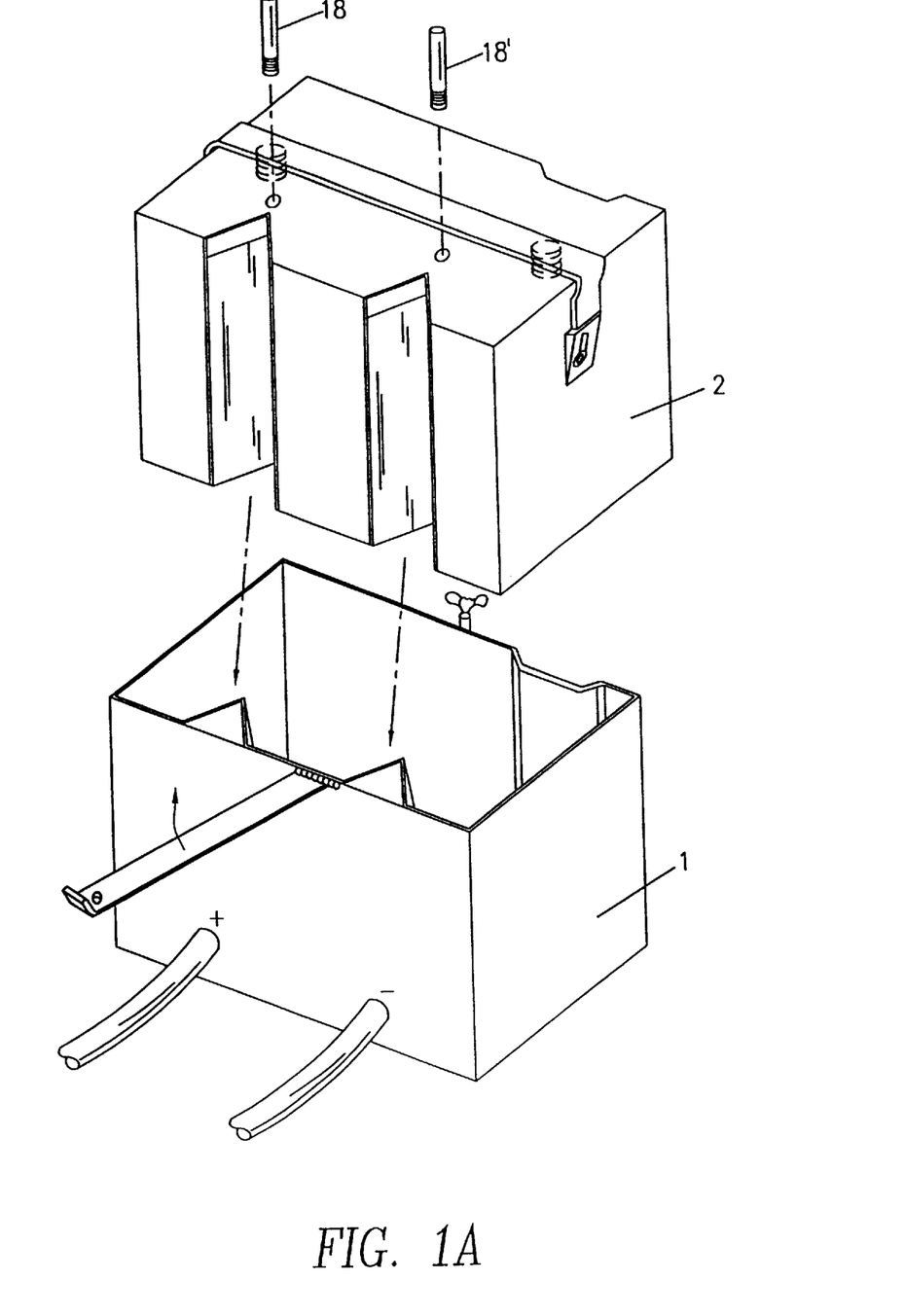
FIG. 1A is a perspective view of the invention showing pins for charging the battery.

FIG. 1A, illustrates a pair of threaded removable charging terminals, 18 and 18', as attached to the battery, 2.

In use, the cables, 8 and 8', of the box, 1, are electrically connected to the electrical system of the vehicle as seen in FIG. 1. The vehicle may employ a plurality of the battery boxes, 1, and batteries, 2.

Figure 2:
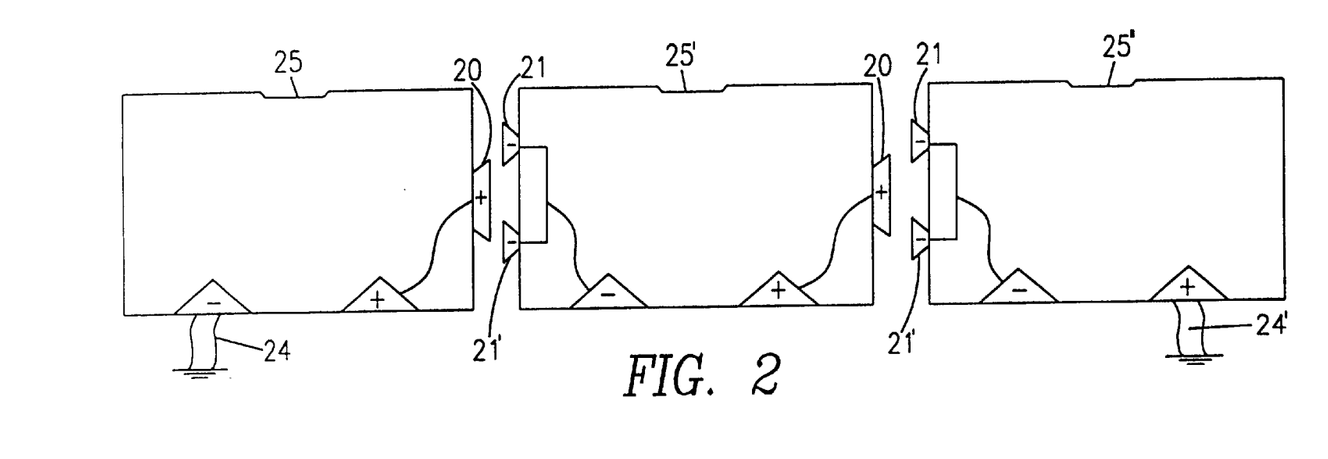
FIG. 2 is a schematic showing the battery boxes in series, attached to each other by connecting terminals, showing cables emanating from the end boxes.
Figure 2A:
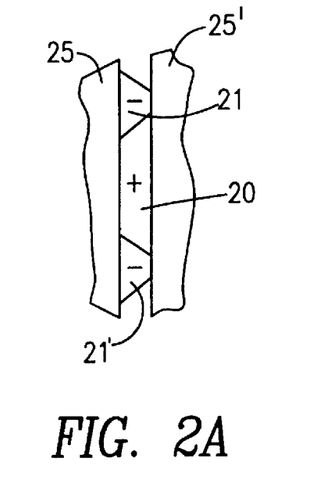
FIG. 2A is a detail of the interface between the batteries on FIG. 2.
Figure 2B:
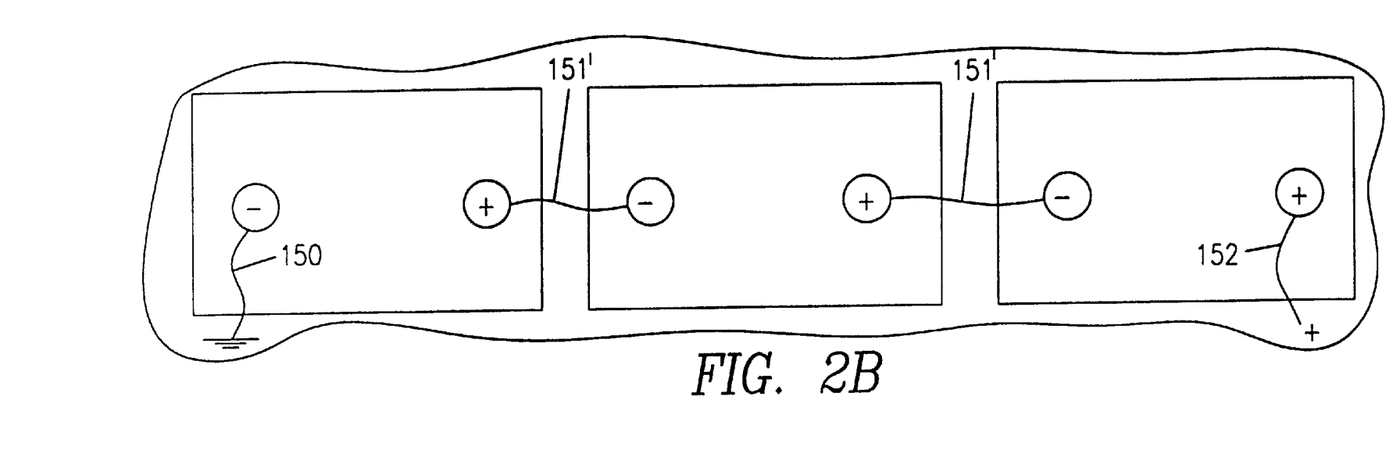
FIG. 2B is a schematic of a plurality of battery boxes wire in series.

As seen in FIG. 2, a plurality of electrically connected boxes, 25, 25'and 25", respectively, may be connected in series through connectors, 20 and 21 and 21', respectively. FIG. 2A, illustrates, in detail, a series electrical connection between the boxes, with plugs 20, 21 and 21', shown in contact. A schematic diagram of a plurality of series battery hookups is shown in FIG. 2B. Internal connections, 150 and 152 are shown. External connections, 151 and 151'are shown.

Figure 3:
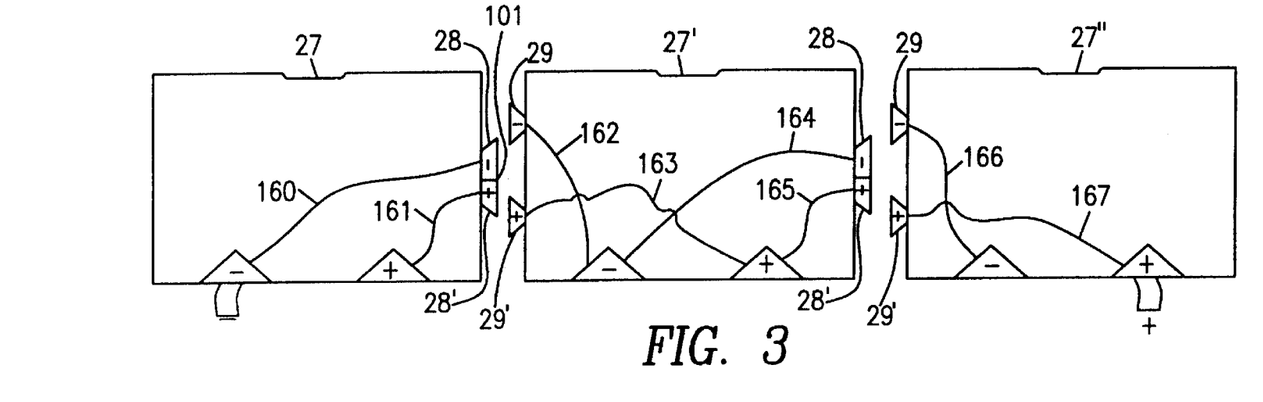
FIG. 3 is a schematic showing the battery boxes in parallel attached to each other by connecting terminals and showing cables emanating from the end boxes.
Figure 3A:
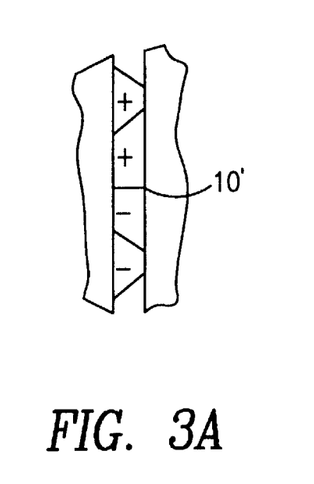
FIG. 3A is a detail of the interface between the batteries on FIG. 3.
Figure 3B:
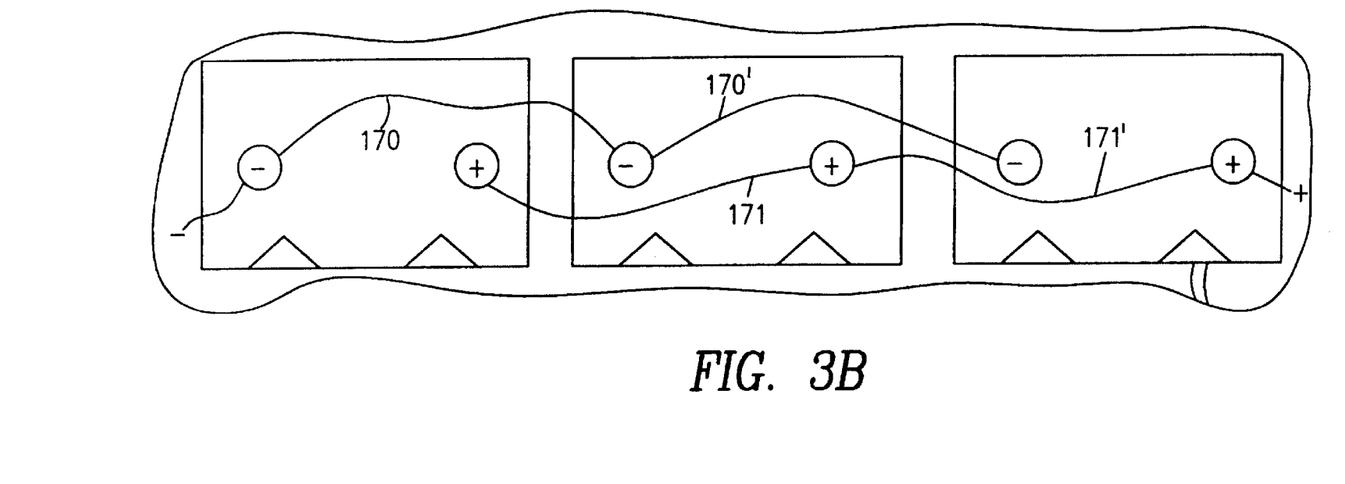
FIG. 3B is a schematic of a plurality of battery boxes wired on parallel

As further seen in FIG. 3, a plurality of electrically connected boxes, 27, 27'and 27"respectively, connected in parallel through connectors, 28, and 29 and 29'and 28'and 29 and 29', respectively. The positive and negative terminals are separated by an insulator, 101. As can be seen the end boxes contain internal connections, 160 and 161, and 166 and 167, respectively; whereas the internal box or boxes contains internal connection 162, 163, 164 and 165, respectively. FIG. 3A shows the detail of the electrical connection of boxes 27 and 27'. A schematic diagram of a plurality of parallel battery hookups is show in FIG. 3B. As can clearly be seen a set of internal electrical connections are provided, showing parallel connections, 170 and 170', and 171 and 171', respectively.

Figure 4:
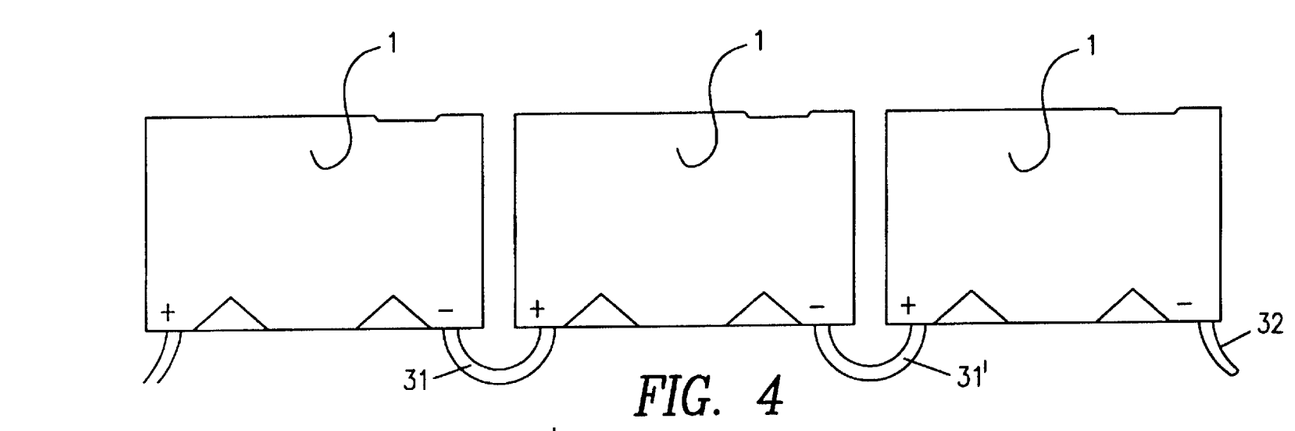
FIG. 4 is a schematic showing the battery boxes connected by cables.

The boxes, 1, may be connected electrically through cables, 31 and 31'. This is seen in FIG. 4.

Figure 5:
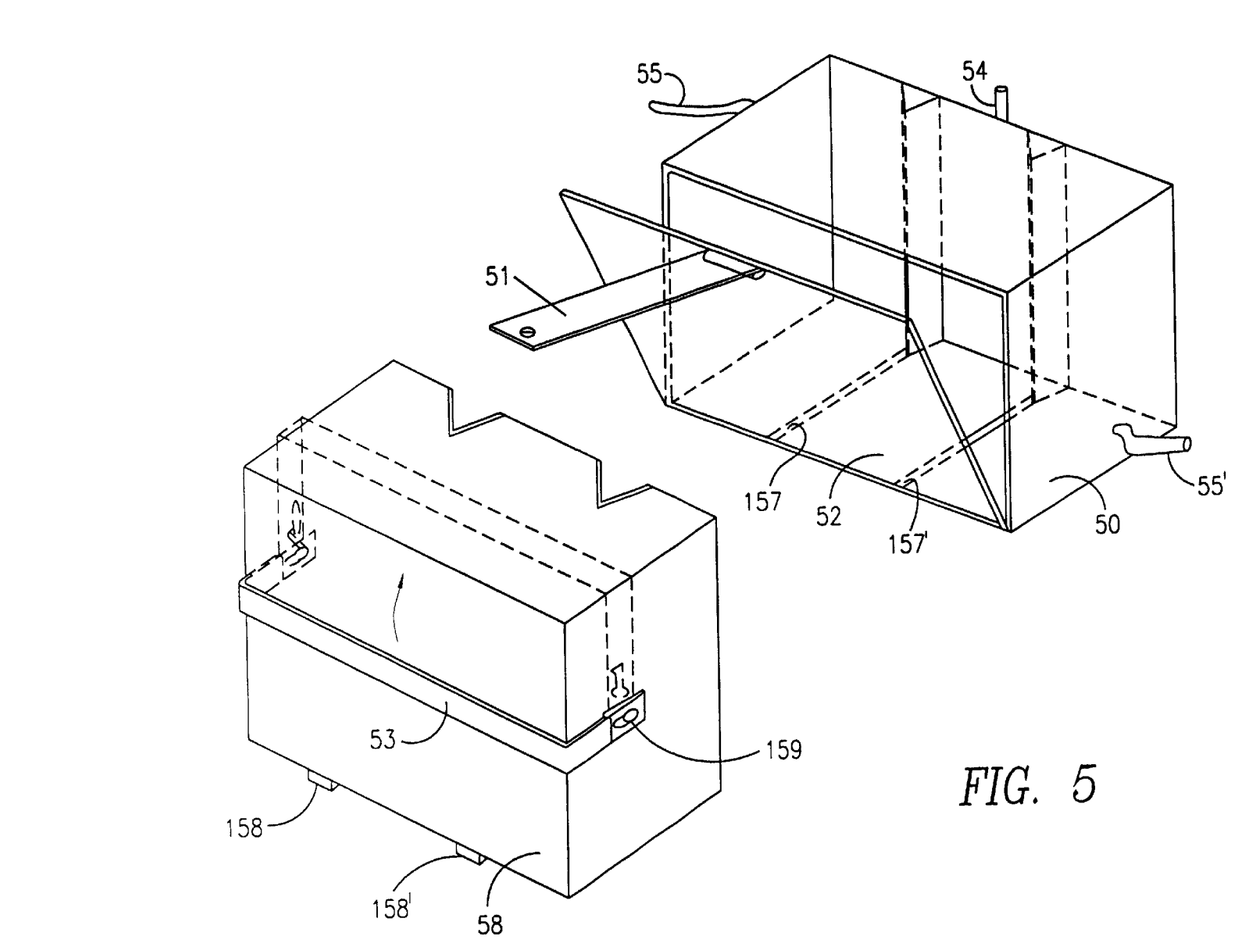
FIG. 5 is a perspective view of the invention showing the battery box for insertion in the front, rear vertical terminals, and swivel handle.

As in FIG. 5, the box, 50, may be opened through the front, with a front entry box cover, 52. A handle, 53, swings from the front of the battery to its top when the battery is inserted in the box. A slot, 159, locks the handle in place. A pair of guide rails on the battery, 158 and 158', respectively, match a pair of guide grooves on the box, 157 and 157', to facilitate insertion and removal.

Figure 6:
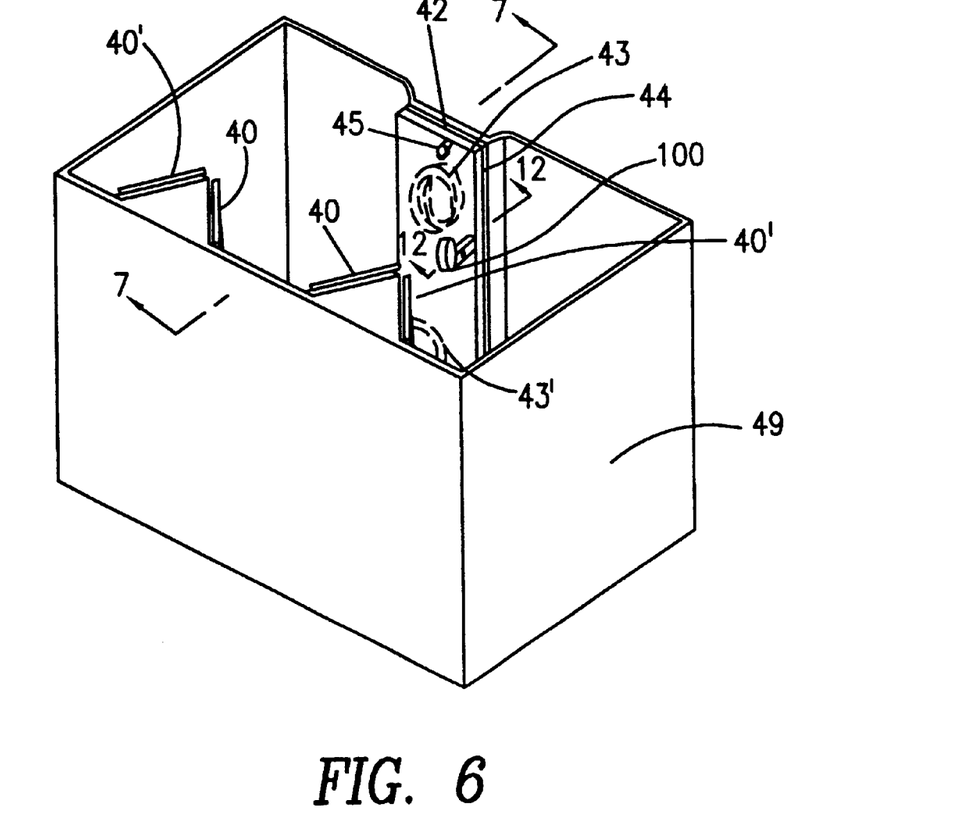
FIG. 6 is the perspective view of the invention showing a spring loaded arrangement means to facilitate removal of the battery.

FIG. 6, shows another embodiment of the invention. In this embodiment, terminal spring plates, 40 and 40', are placed parallel to the terminals in the front of the box and a spring, 43, loaded pressure plate, 44, parallel to a back plate, 42, places additional pressure on the battery. A non-conducting rivet, 45, holds the back plate in place. A latch, 100, assists in the removal of the battery.

Figure 7:
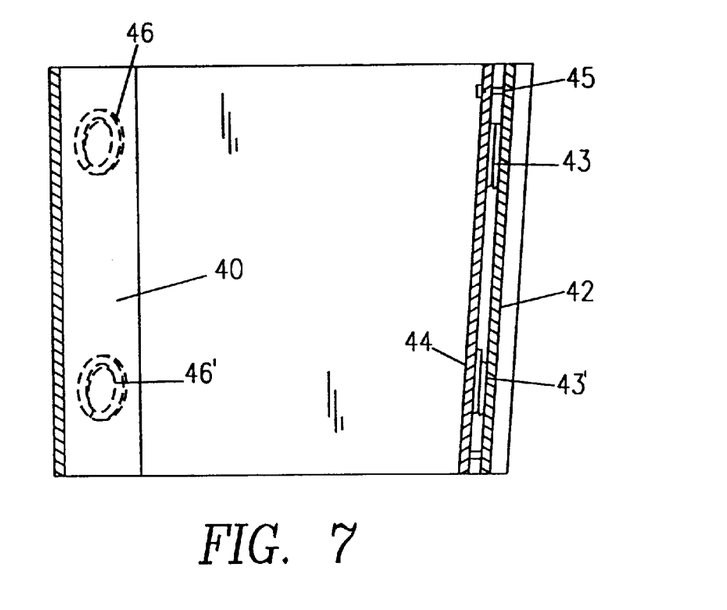
FIG. 7 is a cross-section of FIG. 6 showing the spring mechanism.

Referring to FIG. 7, which is a cross sectional view through line 7—7 of FIG. 6, as the battery (not shown) is inserted into the box, 49, the springs, 43 and 43', apply pressure, against the plates, 42 and 44, respectively, to securely hold the battery in place. A similar set of springs, 46 and 46', are found in the terminal spring plates, 40 and 40'.

Figure 7A:
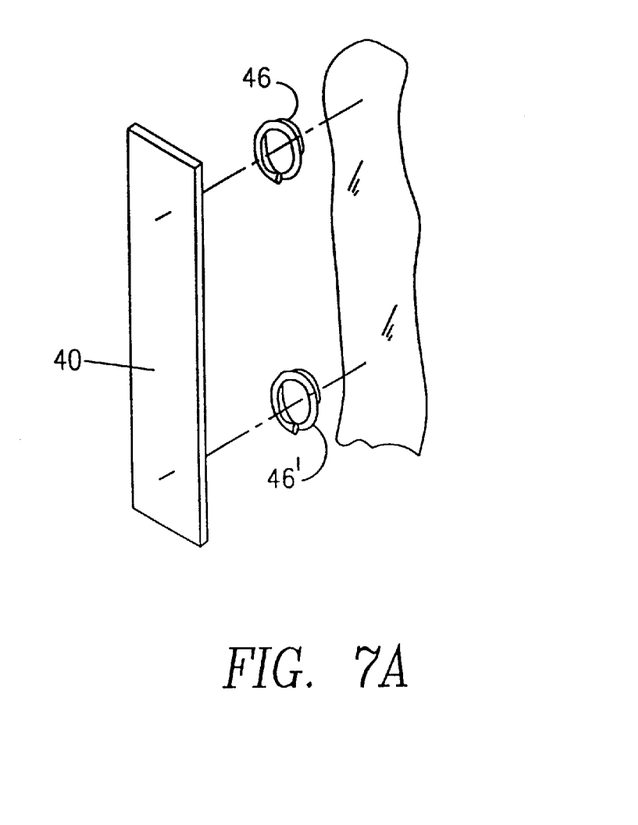
FIG. 7A is a detail of FIG. 7 showing the spring mechanism.

FIG. 7A a detail of FIG. 7, showing the spring mechanism, 46 and 46', behind the terminal plates.

Figure 8:
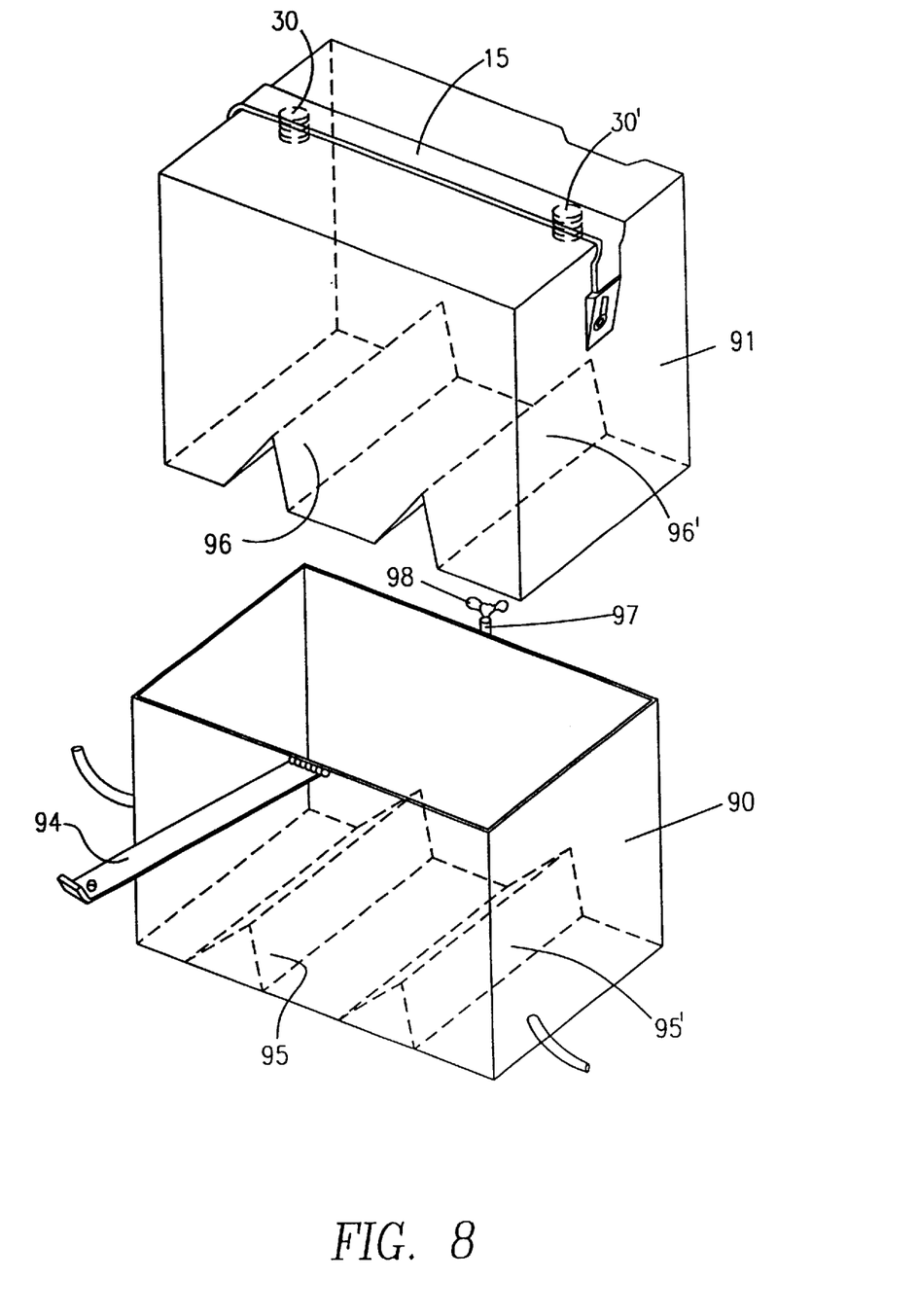
FIG. 8 is a perspective view of the invention showing the battery boxes'top entry with terminals on bottom.

FIG. 8 illustrates still another embodiment of the invention. Here, the battery, 91, has terminals, 96 and 96'on its bottom. The weight of the battery enhances contact with terminals, 95 and 95'on the box 90. A locking lever, 94, is shown. The spring loaded handle, 15, together with springs, 30 and 30', are used for ease of grasping and insuring continuous terminal contact.

Figure 8A:
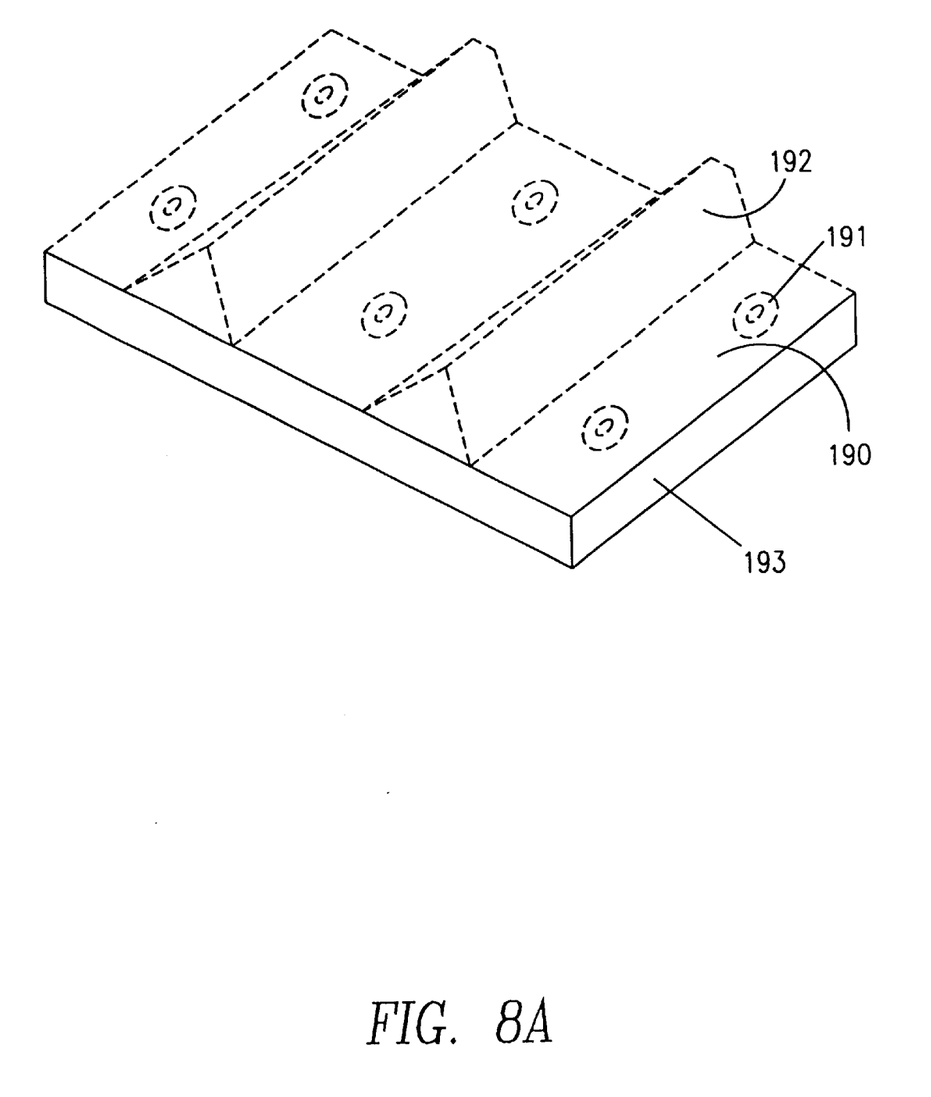
FIG. 8A is a perspective view showing springs on the bottom terminal base of the battery box.

As shown in FIG. 8A, a plurality of springs, 191, are affixed between terminal plate, 192, and the inside of the battery box, 193, thereby enhancing the removal of the battery.

Figure 9:
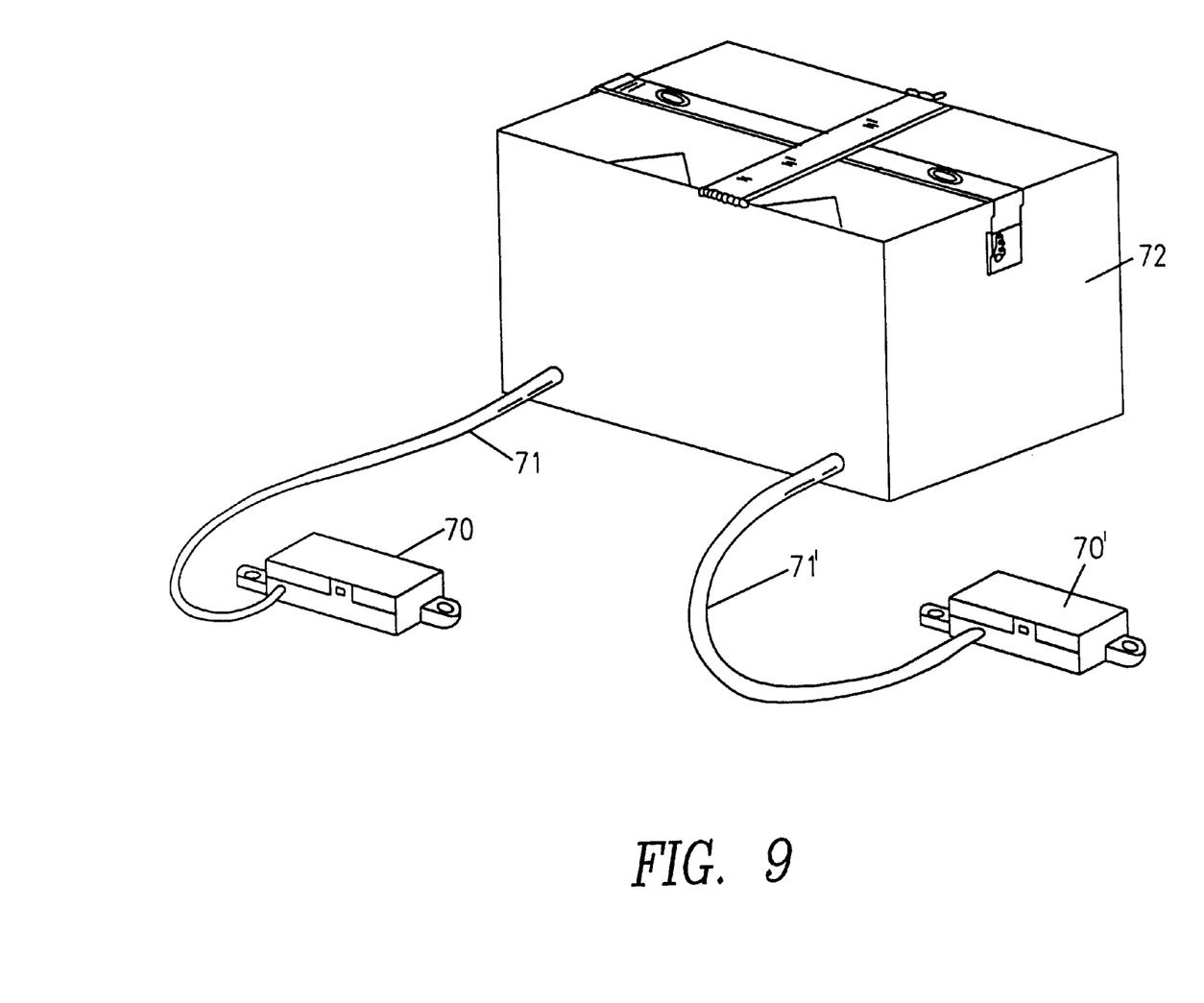
FIG. 9 is a perspective view of the invention showing the connection to a junction box.
Figure 9A:
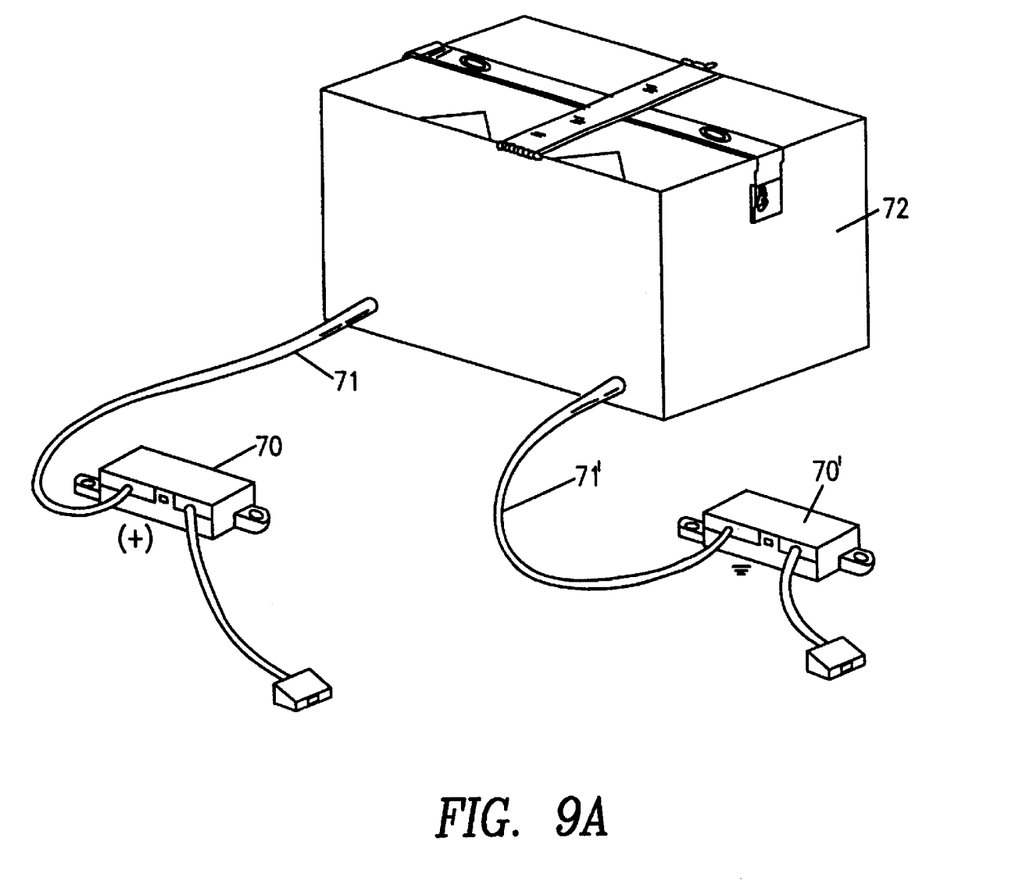
FIG. 9A is a perspective view showing the wiring from a junction box to a terminal port.
Figure 11:
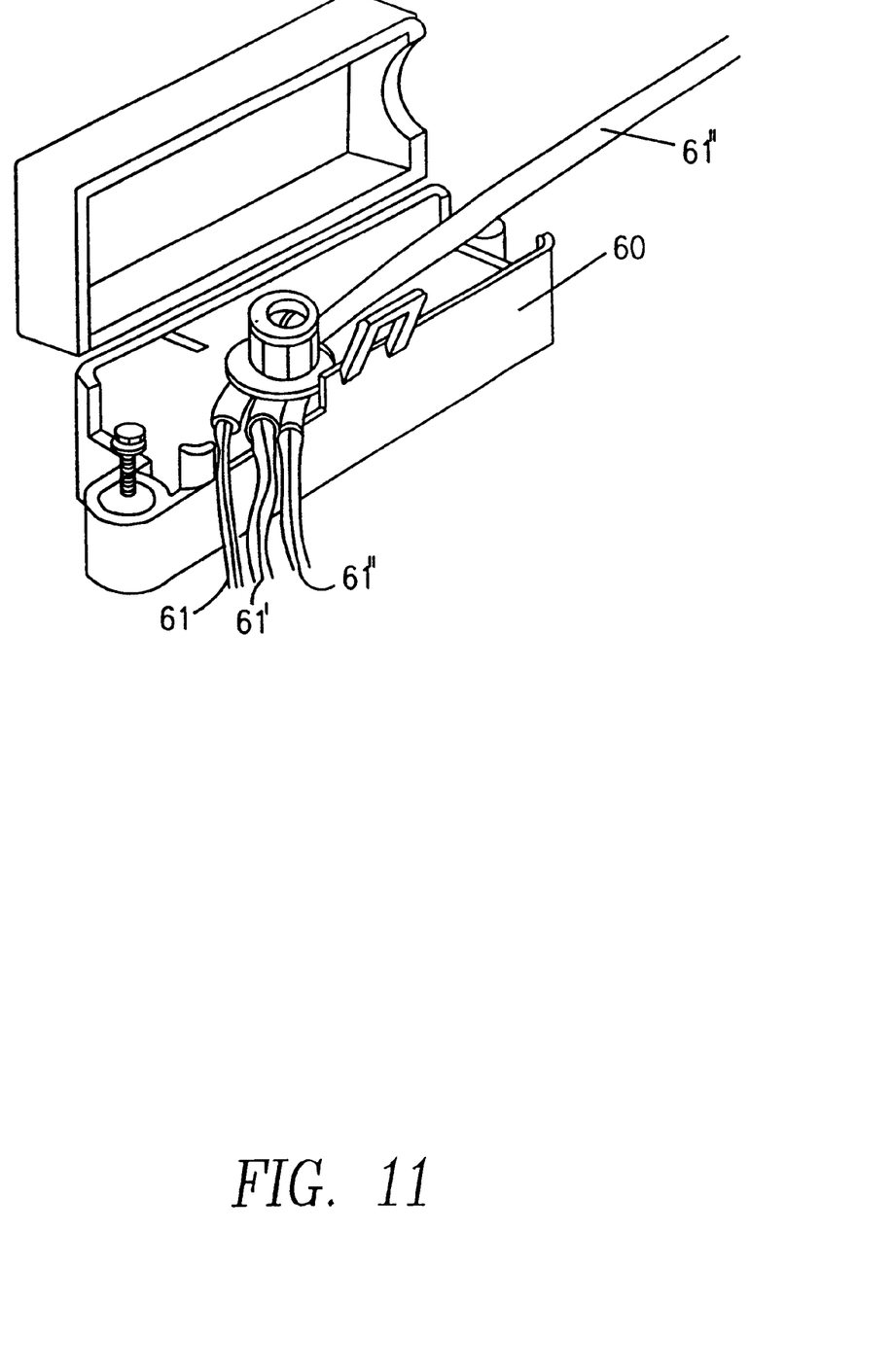
FIG. 11 is a perspective view of an electrical junction box.
Figure 11A:
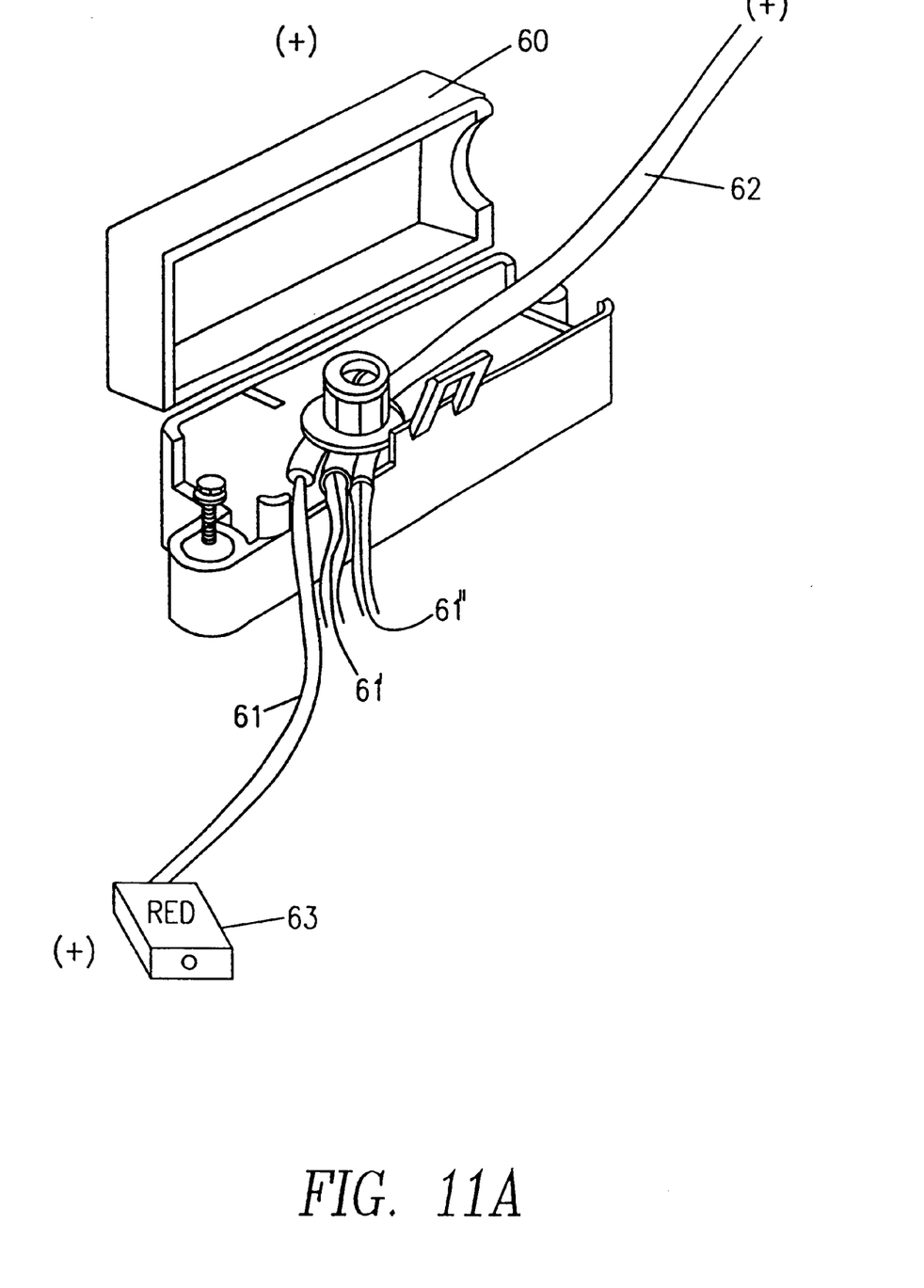
FIG. 11A is a perspective view of a detail of the wiring coming from a junction box, showing the positive battery cable.
Figure 11B:
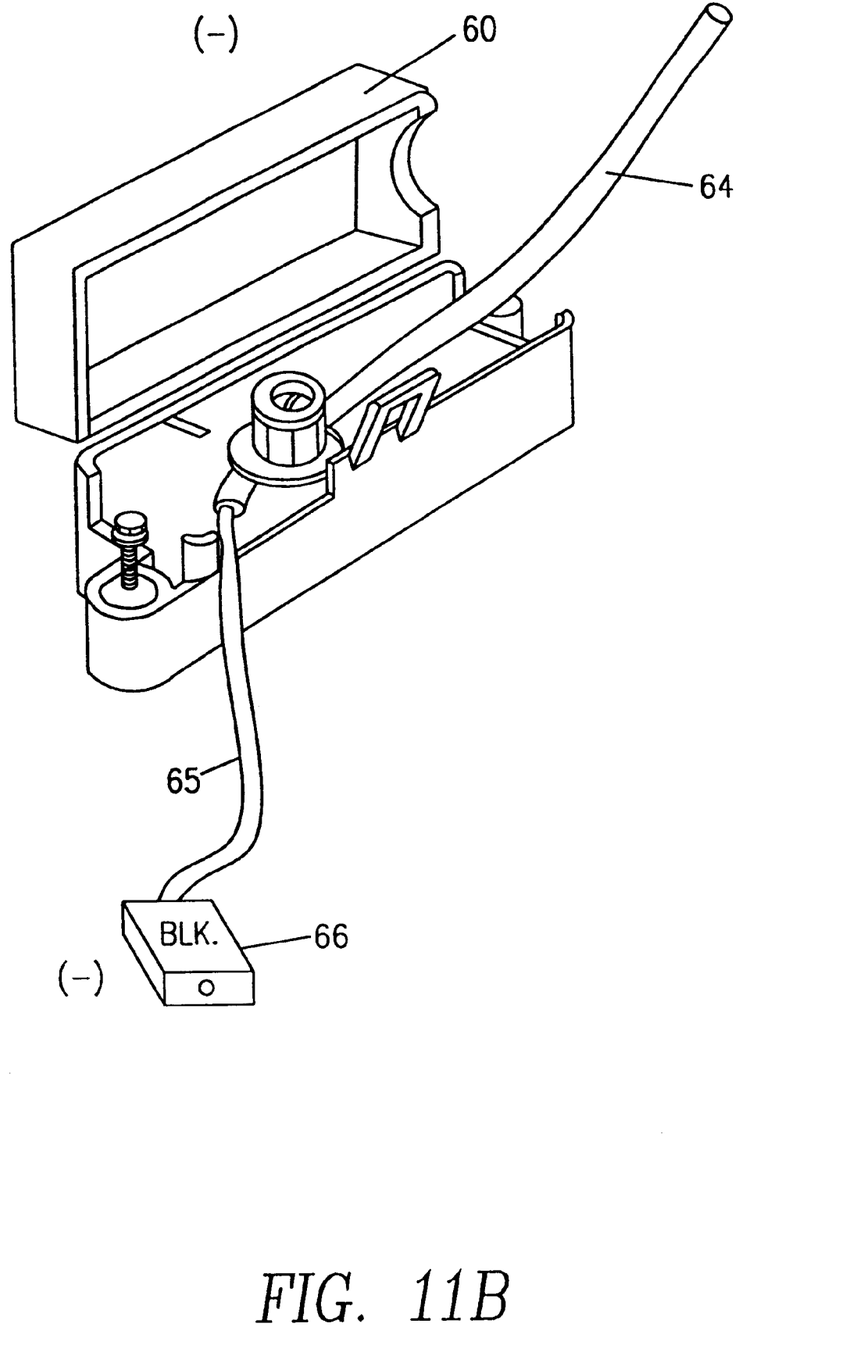
FIG. 11B is a perspective view of a detail of the wiring coming from a junction box, showing the negative battery cable.

FIG. 9 shows cable, 71 and 71', eminating from each end of the box, 72, and each connected to a junction box, 70 and 70'. In the case of multiple boxes, the cables typically eminate from the end boxes. FIG. 9A shows the connection from a junction box to a terminal. FIG. 11 shows an illustrated junction box, 60, connected to a plurality of cables, 61, 61', 61"and 61'". FIG. 11A is a detail of a junction box, 60, showing a port, 63, and a positive cable from a battery, 62. FIG. 11B is a detail of a junction box, 60, showing a port, 66, and a negative cable from a battery, 64.

Figure 10:
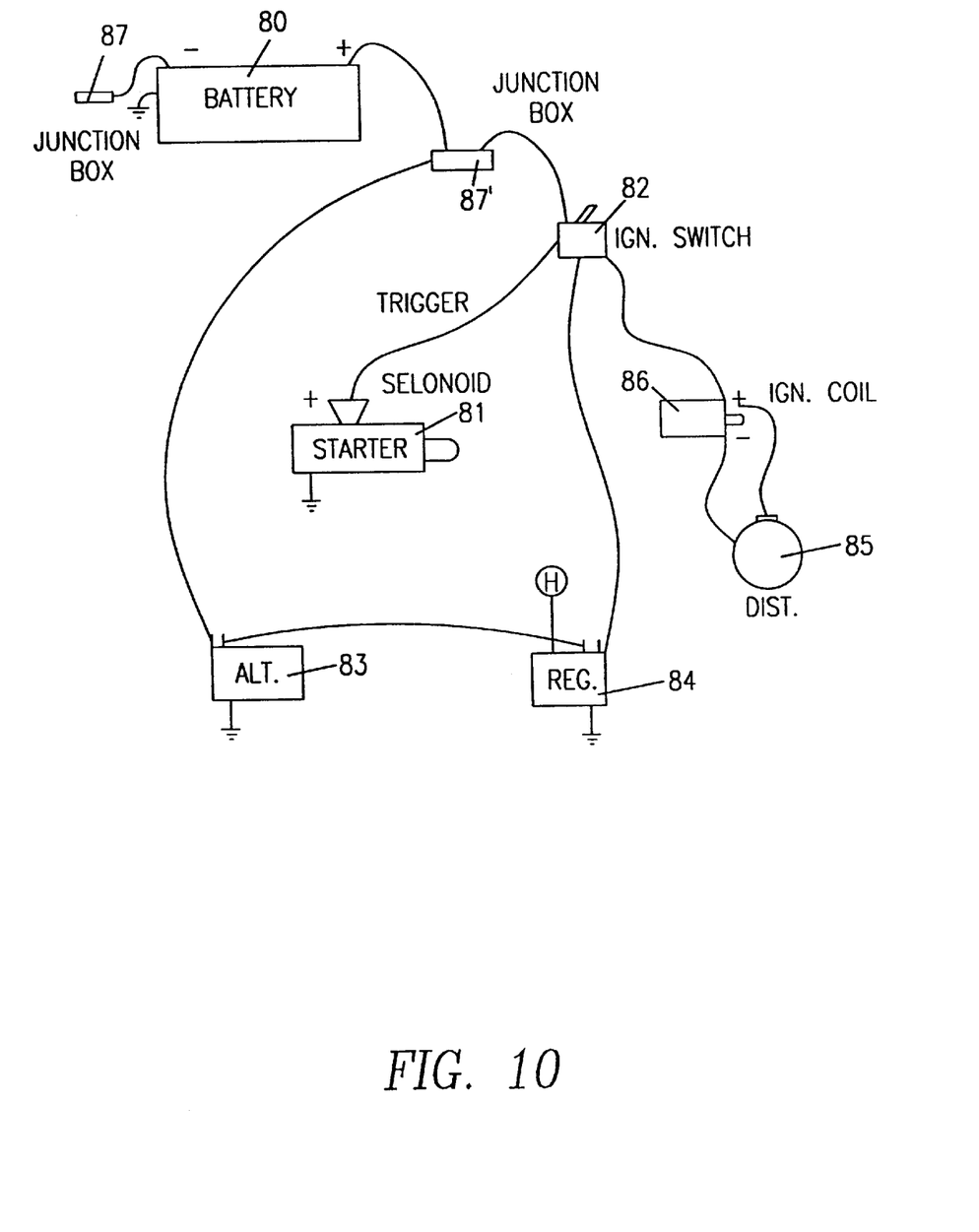
FIG. 10 is a schematic drawing of an automotive electrical system showing the battery.

FIG. 10 illustrates a typical automotive electrical system showing the battery, 80, connected to junction boxes, 87 and 87'. An ignition switch, 82, is connected to junction box 87, a starter, 81 and the ignition coil, 86 and related distributor 85, junction box, 87'is connected to the alternator, 83 and regulator, 84.

Figure 12A:
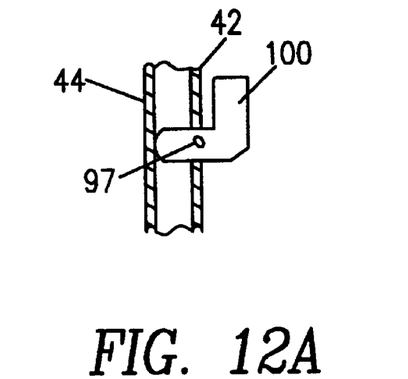
FIG. 12A is a detailed view of an extraction lever as a cross section in FIG. 6, closed position.
Figure 12B:
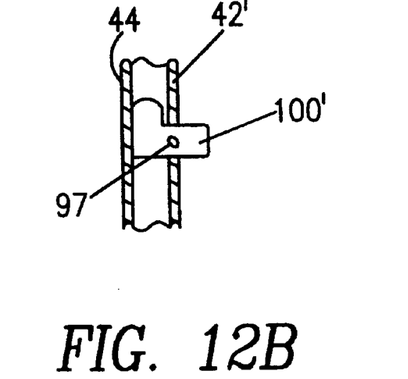
FIG. 12B is a detailed view of an extraction lever as a cross section in FIG. 6, open position.

FIGS. 12A and 12B are cross-sections through FIG. 6. In FIG. 6, when the battery (now shown) is inserted in the box, 49, a set of springs, 43 and 43, between the front back plate, 44, and the rear back plate, 42, apply pressure to hold the battery in place. The lever, 100, shown in FIGS. 12A and 12B, is affixed to the rear back plate, 42, and pushes against the front back plate, 44, after the battery is inserted in the box, 49. The lever revolves around rivet, 97. Flipping the lever, 100, relieves the pressure on the battery and eases release of the battery. The plates are typically held in place by a rivet, 45.

I claim:

1. A battery system for a vehicle, the battery system comprising:
   a vehicle battery including a pair of electrical terminals;
   a box to be mounted to a portion of the vehicle, the box for holding the vehicle battery, the box including an opening for inserting the battery into the box and a pair of electrical terminals that electrically contact the pair of electrical terminals of the vehicle battery when the vehicle battery is inserted in the box; and
   a pair of electrical terminal leads electrically coupled to the electrical terminals of the box;
   wherein the electrical terminals of the box have one of a convex and concave shape and the electrical terminals of the battery have the other one of the convex and concave shape, the convex and concave electrical terminals insuring that the battery is inserted into the box in an orientation that maintains correct polarity of the electrical terminals.

2. The battery system according to claim 1, wherein the at least one electrical terminal of the box is V-shape and the at least one of the electrical terminal of the battery is V-shape.

3. The battery system according to claim 1, wherein the box further comprises a latch that extends across the opening of the box in a locked position to secure the battery inside the box.

4. The battery system according to claim 1, wherein the battery further comprises a carrying strap.

5. The battery system according to claim 4, wherein the battery further comprises at least one spring that holds the carrying strap away from a surface of the battery.

6. The battery system according to claim 1, wherein the box further comprises at least one spring for biasing the at least one terminal of the box against the corresponding one of the first and second terminals of the battery.

7. The battery system according to claim 6, wherein the box further comprises a pressure plate and at least one spring that biases the pressure plate against the battery.

8. The battery system according to claim 7, wherein the box further comprises a lever, which when actuated, moves the pressure plate away from the battery.

9. The battery system according to claim 1, further comprising a guide rail associated with the box and a complementary shaped guide rail associated with the battery, the guide rails further insuring that the battery is inserted into the box in an orientation that maintains correct polarity of the electrical terminals.

10. The battery system according to claim 1, wherein the box further comprises at least one tapered wall and the battery further comprises at least one tapered wall which conforms to the at least one tapered wall of the box.

11. The battery system according to claim 1, wherein the battery further comprises a second pair of electrical terminals.

12. The battery system according to claim 11, wherein the second pair of electrical terminals are removable from the battery.

13. The battery system according to claim 1, further comprising at least a second vehicle battery and at least a second box to be mounted to a second portion of the vehicle, the at least second box for holding the at least second vehicle battery, the boxes having means for electrically connecting the boxes in series.

14. The battery system according to claim 1, further comprising at least a second vehicle battery and at least a second box to be mounted to a second portion of the vehicle, the at least second box for holding the at least second vehicle battery, the boxes having means for electrically connecting the boxes in parallel.

15. The battery system according to claim 1, wherein the electrical terminals of the battery each lave a non-conductive portion that prevents electrical short circuiting if an attempt is made to insert the battery into the box in an orientation that does not maintain correct polarity of the electrical terminals.

16. A battery system for a vehicle, the battery system comprising:

a vehicle battery including a pair of electrical terminals;

a box to be mounted to a portion of the vehicle, the box for holding the vehicle battery, the box including an opening for inserting the battery into the box and a pair of electrical terminals that electrically contact the pair of electrical terminals of the vehicle battery when the vehicle battery is inserted in the box; and a pair of electrical terminal leads electrically coupled to the electrical terminals of the box;

wherein at least one of the electrical terminals of the box has one of a convex and concave shape and at least one of the electrical terminals of the battery has the other one of the convex and concave shape, the at least one electrical terminals of the box and battery insuring that the battery is inserted into the box in an orientation that maintains correct polarity of the electrical terminals.

17. A battery system for a vehicle, the battery system comprising:

a vehicle battery including a pair of electrical terminals having one of a convex and concave shape, and a guide rail;

a box to be mounted to a portion of the vehicle, the box for holding the vehicle battery, the box including an opening for inserting the battery into the box and a pair of electrical terminals having the other one of the convex and concave shape that electrically contact the pair of electrical terminals of the vehicle battery when the vehicle battery is inserted in the box, and a guide rail having a shape complementary to the guide rail of the battery; and a pair of electrical terminal leads electrically coupled to the electrical terminals of the box; and wherein the guide rails insure that the battery is inserted into the box in an orientation that maintains correct polarity of the electrical terminals.

* * * * *